United States Patent Office 3,311,813
Patented Mar. 28, 1967

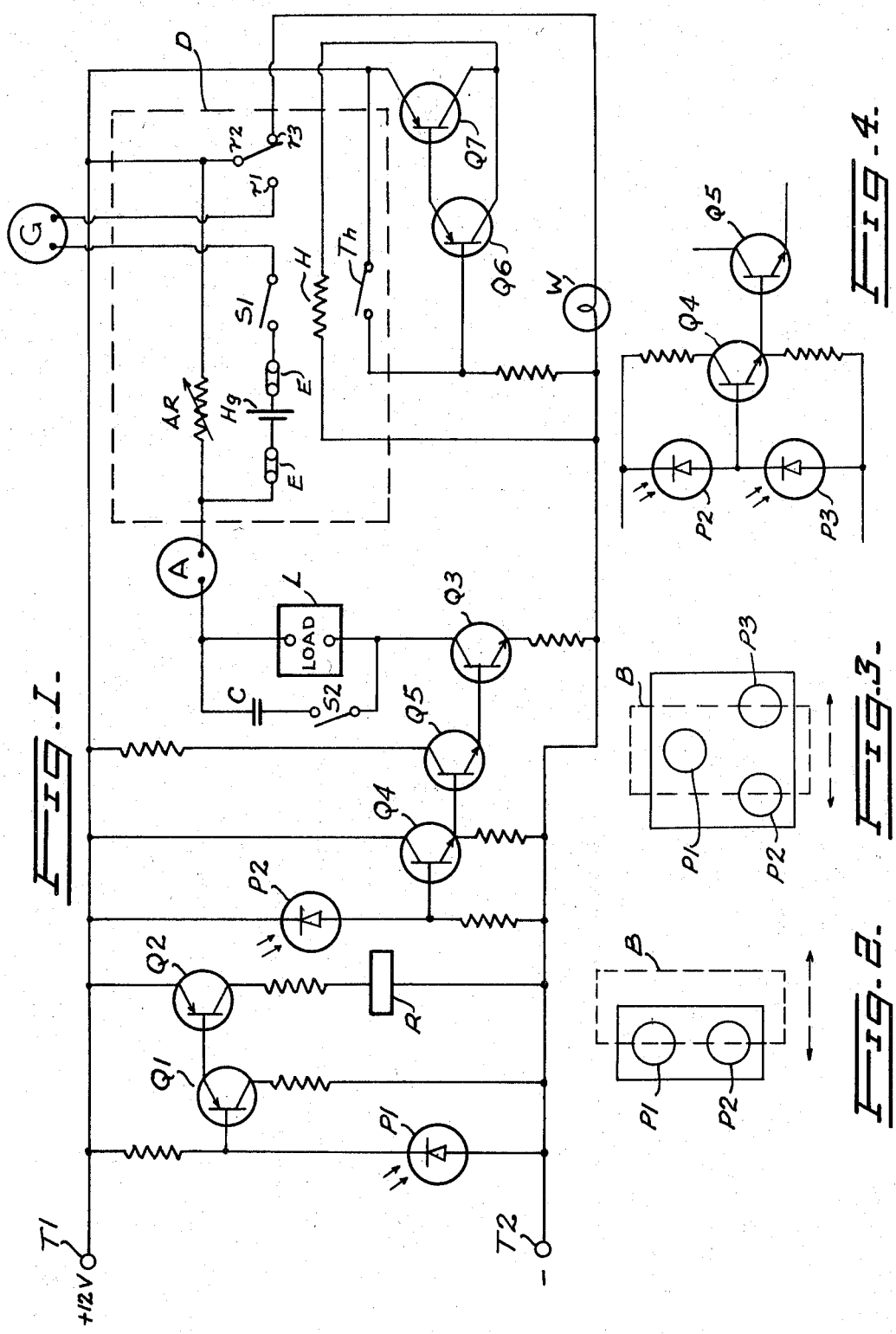

3,311,813
PHOTOSENSITIVE DEVICE CONTROLLED VOLTAGE-CURRENT REGULATING SYSTEMS
Jack Sutcliffe, Smiths Falls, Ontario, Canada, assignor to Guildline Instruments Limited, Smiths Falls, Ontario, Canada
Filed Sept. 23, 1965, Ser. No. 489,680
Claims priority, application Canada, Dec. 20, 1962, 865,067
7 Claims. (Cl. 323—4)

This application is a continuaton-in-part of application Serial No. 289,120, filed June 19, 1963, now abandoned.

This invention relates to a regulating circuit for maintaining constant the value of an electrical quantity supplied to a load, for example for supplying either a constant current or a constant voltage to a load. The purpose of the invention is to provide circuits that can achieve this result notwithstanding normal variations in the resistance of the load, or variations in the supply voltage.

In one form the object of the invention is to produce a constant current source capable of very high sensitivity, and preferably a sensitivity higher than that of any previously known devices for the same purpose. More specifically, it is desired to provide a circuit capable of achieving a sensitivity of the order of a few parts per million, even in the face of either wide changes of load resistance or supply voltage reduction as large as 25%. Such an instrument has particular utility in controlling the current supplied to a direct current potentiometer.

In another form the object of the invention is to provide a constant voltage source, similarly capable of high sensitivity.

These objects are achieved by means of the circuits described below in detail. It is to be understood that such specific description is provided by way of example only and not by way of limitation of the invention the scope of which is determined by the appended claims. The description which follows should be read in conjunction with the accompanying drawings.

FIGURE 1 is a circuit diagram of a constant current source;

FIGURE 2 is a view of the physical arrangement of the photo-diodes which form part of the circuit of FIGURE 1;

FIGURE 3 is a modified construction of FIGURE 2;

FIGURE 4 is a fragment of FIGURE 1 showing how it should be modified for use with the FIGURE 3 construction;

Figure 5:
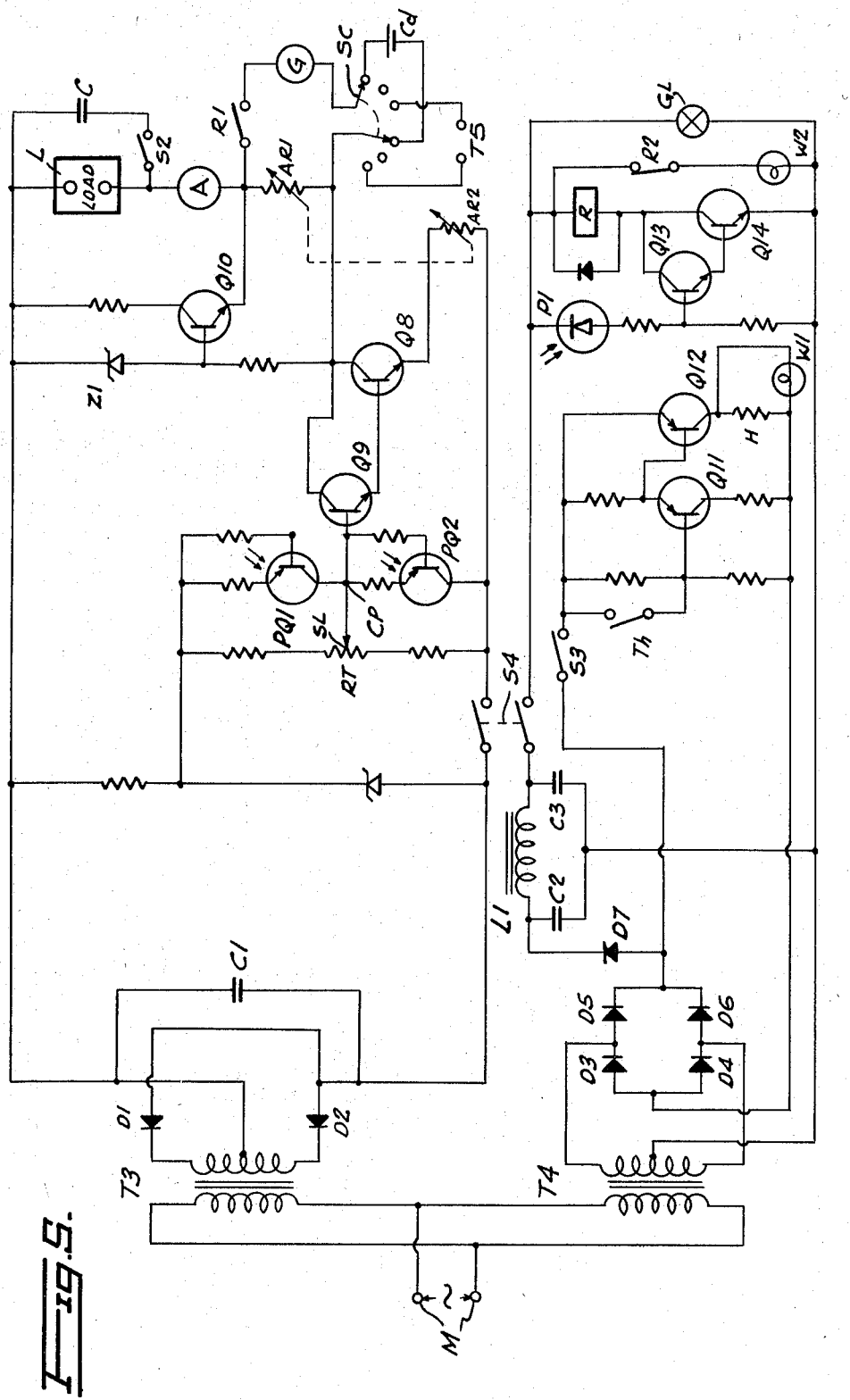
FIGURE 5 is an alternative circuit for a constant current source.

As FIGURE 2 shows, a pair of photo-sensitive diodes P1 and P2 are arranged immediately one above the other so that each is partly illuminated by an edge strip of a beam of light B reflected from the mirror of a galvanometer shown in FIGURE 1 at G. As the galvanometer G deflects, the light beam B moves to one side or the other, so that both photo-diodes P1 and P2 receive either more or less light simultaneously.

Photo-diode P1 functions as a safety switch. When energized, it actuates a relay R, through amplifying transistors Q1 and Q2. Relay R then closes its contacts r1, r2 to close a loop consisting of the galvanometer G, a main on-off switch S1, a standard source of voltage (shown as a mercury cell Hg) and an adjustable resistor AR. This resistor AR, which will be an instrument of high precision, is also connected in a series circuit extending between terminals T1 and T2 of an external voltage supply. This circuit, the load circuit, also includes an ammeter A, the load L and a transistor Q3 which functions as a variable resistance means. The load circuit is initially set up and adjusted so that the adjustable resistor AR is of such a value that, with the desired current in the load L, the voltage drop across the resistor AR exactly balances the voltage of the standard source (nominally 1.35 volts, when a mercury cell is used). Under these conditions galvanometer G shows no deflection and the light beam B illuminates approximately half of each of the photo-diodes P1, P2, as shown in FIGURE 2.

Any variation in the load current will immediately upset this voltage balance and begin to deflect the galvanometer G, thus varying the degree of illumination of the photo-diodes. In photo-diode P2 this effect will appear as a variation in output, which in turn is amplified by transistors Q4 and Q5 to modify the base-emitter current of transistor Q3. In this way a resistance in the load circuit is varied, the relation between the sense of the galvanometer's deflection and the variation in illumination of photo-diode P2 having been so chosen that the modification to the collector-emitter resistance of transistor Q3 caused by photo-diode P2 is in the correct direction to restore the load current to its chosen value. In the circuit illustrated, if the load current drops, galvanometer G must increase illumination of photo-diode P2 in order to restore such current.

Both photo-diodes face the positive supply so that their normally high reserve resistance limits current to a low value until light reduces the resistance and allows a current to flow. Photo-transistors may be used in place of conventional photo-diodes.

Should there be a failure of the lamp in the galvanometer, a failure of the power supply, or some other disruption to the delicate balance that might cause excessive deflection of the galvanometer, withdrawal of the light beam B from photo-diode P1 will de-energize relay R to open the galvanometer circuit at contacts r1, r2 and illuminate warning lamp W by contacts r2, r3.

For best results the temperature of the cell Hg and the adjustable resistor AR should be closely controlled, for which purpose these parts are enclosed in a space D. The various contacts in the balancing loop are also enclosed in space D to minimize spurious voltages set up by thermo-electric effects. The space D is heated by heater H under the control of a thermostat Th acting through transistors Q6 and Q7. The manner of functioning of these transistors, like that of transistors Q1 to Q5, is well known and requires no further explanation. Obviously any other form of temperature control may be used, just as any other method of amplifying the output of photo-diode P2 and using such amplified output to modify the resistance in the load circuit, can be employed.

The mercury cell Hg is connected in the circuit by removable links E to facilitate substitution of some other standard source of voltage such as a cadmium standard cell.

If desired, a filter in the form of a capacitor C, with a series switch S2, may be placed across the load L to shunt out any electromagnetic or electrostatic alternating current interference.

An alternative arrangement is shown in FIGURE 3. Here three photo-diodes P1, P2 and P3 are used. Diode P1 functions as before, and diodes P2 and P3 are both partly illuminated by opposite edge strips of the beam B. They then act in conjunction (in the manner illustrated in FIGURE 4) to effect double the sensitivity. Another advantage of this arrangement is that variations in light intensity produce effects which are in mutual opposition and therefore have no effect on the output current.

Reference will now be made to FIGURE 5. This figure shows a constant current source circuit operated from mains supply M feeding two transformers T3 and T4 respectively, the transformer T3 being provided to supply the working current, while the transformer T4 supplies power for the lamp and heater, and for the safety relay Diodes D1 and D2 in the secondary circuit of the transformer T3 provide full wave rectification, smoothed by condenser C1. The load L is essentially the same as in FIGURE 1, being still provided with a shunt circuit of capacitor C and switch S2. As in FIGURE 1, the load L is connected in series with a milliammeter A and a first half AR1 of a standard adjustable resistor. The load circuit continues through a transistor Q8 which, similarly to the transistor Q3, functions as a variable resistance means, then through a second part AR2 of the standard adjustable resistor, and hence back to the negative side of the power supply.

Again similarly to FIGURE 1, the voltage across the adjustable resistor portion AR1 is compared by galvanometer G with that of a standard cadmium cell Cd, when a switch SC is in the position shown, or with some other external voltage supplied across terminals T5, when the switch SC is in its other extreme position. This galvanometer circuit is only closed when contacts R1 of relay R are closed. It will be noted that the operation of this part of the circuit is basically the same as that of FIGURE 1.

The circuit of FIGURE 5 differs, however, in the use of a pair of photo-transistors PQ1 and PQ2 to replace the photo-diodes P2 and P3 of FIGURE 4. The photo-transistors PQ1 and PQ2 are nevertheless arranged physically in the same manner as illustrated in FIGURE 3. In other words the galvanometer beam B will, under balanced conditions, illuminate half of each of the photo-transistors. Any swing in the galvanometer beam will increase the illumination of one photo-transistor and decrease that of the other. The centre point CP between the photo-transistors is initally adjusted by means of a slider SL on a trimming resistor RT. Any subsequent unbalance in the potential between the photo-transistors is conducted to the base of an amplifying transistor Q9 which controls the resistance that the transistor Q8 offers in the load circuit. The operation is similar to that of the FIGURE 4 embodiment.

The FIGURE 5 circuit has the added feature of overload protection in the form of a Zener diode Z1. Should the load be accidentally disconnected, so that the voltage across the output terminals exceeds the design value, for example 36 volts, this diode Z1 will conduct to switch on transistor Q10 which then takes over the load current.

The transformer T4 supplies power through rectifying diodes D3 to D6 and a switch S3 to a heater H under the control of a thermostat T$h$ through transistors Q11 and Q12. The operation of this circuit is essentially the same as that shown for the heater H in FIGURE 1. Lamp W1 indicates when the heater is on.

Diodes D5, D6 and D7 also supply direct current to a relay circuit comprising a relay R which is arranged to be switched on through transistors Q13 and Q14 whenever photo-diode P1 is illuminated. The physical arrangement and function of this photo-diode is the same as in FIGURES 1 and 3, its function being to ensure that the relay R will be de-energized whenever the beam B swings so far as not to illuminate the photo-diode P1 at all. The relay R when energized closes its contacts R1 in the circuit of the galvanometer G and, when de-energized, closes its contacts R2 to light an indicating lamp W2. The galvanometer lamp GL is also energized from this power supply, which also includes a smoothing circuit including inductor L1 and capacitors C2 and C3. An on-off switch S4 controls the working and relay circuits.

Figure 6:
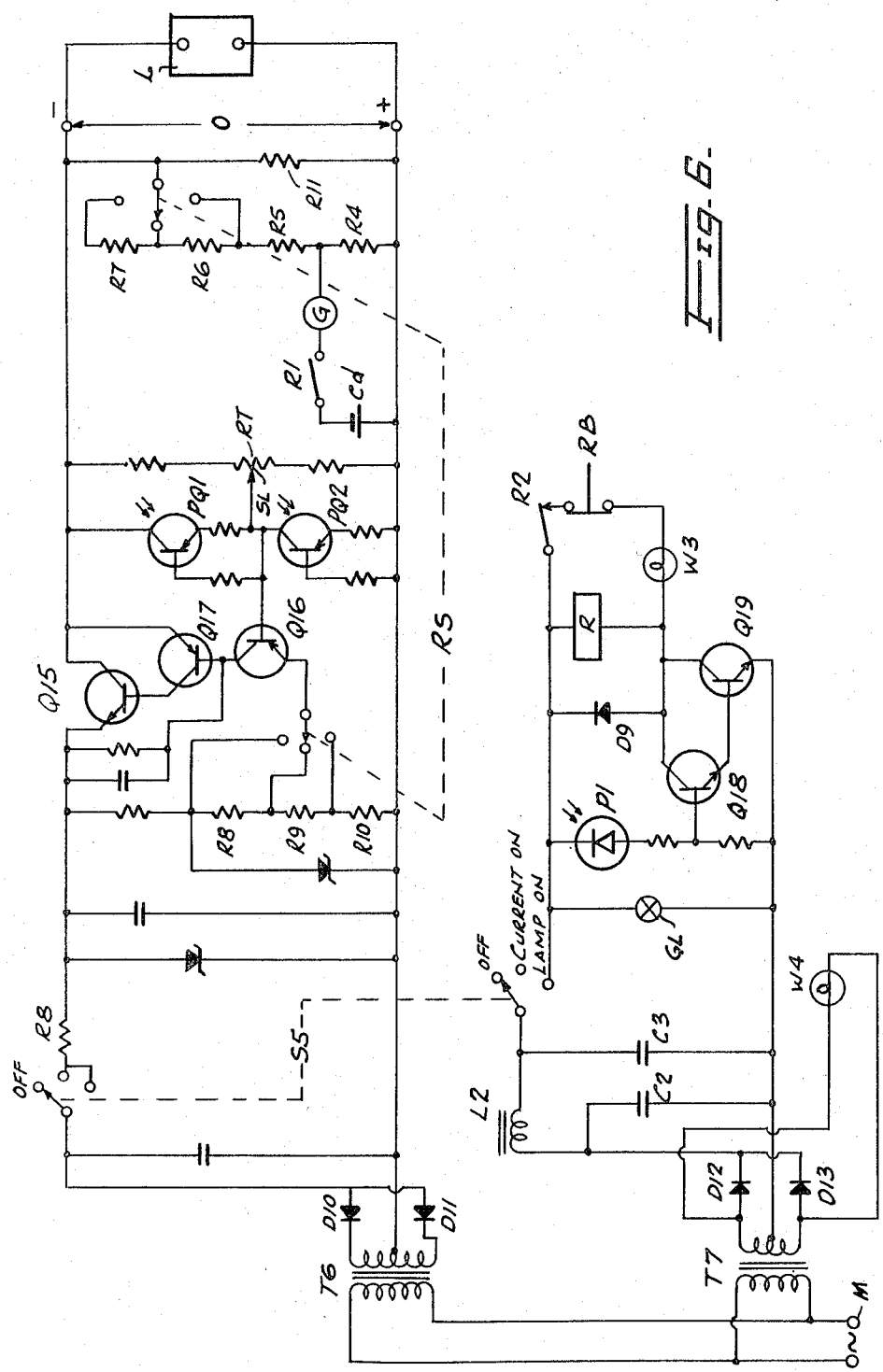
FIGURE 6 is a circuit of a constant voltage source.

Reference will now be made to FIGURE 6, which shows similar principles applied to a constant voltage source circuit. In contrast to the circuit of FIGURE 5 which typically has an output resistance of $10^{10}$ ohms, the output resistance of the constant voltage source is of the order of $10^{-2}$ ohms. As before, the main supply M feeds to a pair of transformers T6 and T7. The transformers T6 supplies the working circuit. In this case the galvanometer G, when its circuit is closed by contacts R1 of relay R, is again connected in series with a standard cadmium cell Cd to compare the voltage of such cell with the voltage across a resistor R4 which is connected across output terminals O in series with one or more of resistors R5, R6 and R7, depending upon the position of the range switch RS which can be switched to choose between, for example, a four volt, six volt or eight volt output. The supply to the output terminals O is fed from the transformer T6 through rectifying diodes D10 and D11, main switch S5, resistor R8 and transistor Q15, which latter acts as a variable resistance means in the line to the output terminals O. The galvanometer arrangement is essentially the same as has been described in connection with the other embodiments of this invention, its beam illuminating continuously all the photo-diode P1 and parts of the photo-transistors PQ1 and PQ2, in the manner of FIGURE 3.

Initial adjustment is obtained by the slider SL on the trimming resistor RT, this arrangement being similar to that in FIGURE 5. Any swinging of the galvanometer beam is thus detected as a movement of the potential between the photo-transistors PQ1 and PQ2, which potential is amplified in transistors Q16 and Q17 to control the resistance offered in the main circuit by control transistor Q15. A second part of the range switch RS controls the voltage supplied to the emitter of transistor Q16, which voltage is derived from voltage divider resistors R8, R9 and R10.

The control circuit is supplied from transformer T7 through rectifying diodes D12 and D13, smoothing inductor L2 and capacitors C2 and C3, and the control relay R is energized, as before, from the photo-diode P1 through a pair of transistors Q18 and Q19. Relay contact R2 which is closed when relay R is de-energized shorts the relay through lamp W3 and reset push-button RB. With the galvanometer lamp GL on and the light beam B in the correct position, i.e. half illuminating both of the photo-transistors PQ1 and PQ2 and fully illuminating the photo-diode P1, the latter will complete the circuit to the relay R through transistors Q18 and Q19. As soon as the reset button RB is pressed to remove the shunt across relay R, it is energized to open its shunt contact R2 and close its contact R1 to connect the galvanometer coil in series with the standard cell Cd. If there is now any lack of balance between the voltage across resistor R4 and that of the standard cell, the galvanometer will begin to deflect and the photo-transistors PQ1 and PQ2 will modify the resistance of the variable resistance means (transistor Q15) in the supply to the output terminals O.

If excessive current is taken from the output terminals, the galvanometer will over-deflect and the light will be removed altogether from the photo-diode P1 causing de-energization of the relay R and disconnection of the galvanometer G from the standard cell. The circuit can then only be reoperated by pressing the reset button RB. This arrangement also protects the standard cell from overload. Lamp W4 indicates when the power supply is on.

The main on-off switch S5 has three positions: "Off," "Current On" and "Lamp On." When moved from "Off" to the "Current On" position, the circuit to the output terminals O is completed, but the galvanometer lamp GL is off and relay R is de-energized. Under these conditions, the output should be approximately correct and an initial adjustment is made by means of the slider SL on the trimming resistor RT. Then, when the galvanometer lamp is switched on by moving the switch S5 to the "Lamp On" position, and full control is started by energization of relay R, the correction to be made by the galvanometer and standard cell is small and the current taken from this standard cell is thus also kept small. A resistor R11 across output terminals O ensures some current through the transistor Q15 and hence control over the output voltage, even when the output terminals are open circuited, or the resistance of the load L is so high as to draw no appreciable current.

I claim:

1. In a circuit having means for supplying a predetermined steady electrical quantity to a load, the provision of means for maintaining constant the value of said quantity, said value-maintaining means comprising:
   (a) means for generating a voltage proportional to the actual value of said quantity as supplied to the load,
   (b) a source of a standard voltage,
   (c) a galvanometer including a light source and a mirror, said galvanometer being connected to said voltage generating means and to said source for comparing said generated voltage to said standard voltage and for deflecting said mirror upon detection of any lack of equality between said voltages,
   (d) variable resistance means,
   (e) means connecting said variable resistance means in said supplying means in series with the load,
   (f) photo-sensitive means located to receive light from said light source deflected by said mirror for detecting the magnitude and sense of deflection of the galvanometer,
   (g) means connecting said photo-sensitive means to said variable resistance means to vary the latter to modify said supplying means to restore equality between said voltages, and
   (h) means connected to said supply means in parallel with the load to provide a parallel path thereto upon appearance of a voltage across the load in excess of a predetermined value.

2. A circuit according to claim 1, wherein the said electrical quantity is a direct current.

3. A circuit according to claim 1, wherein said quantity is a direct voltage.

4. A circuit according to claim 1, wherein
   (i) said valvanometer projects a light beam having opposite edge strips extending transversely of the direction of movement of said beam on deflection of the galvanometer,
   (j) and said photo-sensitive means comprises a pair of photo-sensitive devices arranged each to be partly illuminated by a respective one of said edge strips so that the relative illumination of said devices varies with deflection of the galvanometer but is independent of the beam intensity,
   (k) said variable resistance means being responsive to said relative illumination.

5. A circuit for maintaining constant the value of a direct current traversing a load, comprising
   (a) an adjustable resistor,
   (b) means connecting said resistor in series with the load,
   (c) a source of known voltage,
   (d) means connecting together the resistor and the source to connect the voltage of the source in balanced opposition to the voltage developed across the resistor by the load current therethrough,
   (e) a galvanometer including a light source and a mirror, said valvanometer being connected to the resistor and the source to detect any lack of balance between said voltages,
   (f) variable resistance means,
   (g) means connecting said variable resistance means in series with the load,
   (h) photo-sensitive means located to receive light from said light source deflected by said mirror for detecting the magnitude and sense of deflection of the galvanometer,
   (i) means connecting said photo-sensitive means to said variable resistance means to vary the same to modify the load current to restore said balance,
   (j) further photo-sensitive means for detecting occurrence of failure or excessive deflection of the galvanometer,
   (k) and safety means connected to said further photo-sensitive means for actuation thereby to interrupt the circuit through the galvanometer upon such an occurrence.

6. A circuit for maintaining constant the value of a direct current traversing a load, comprising
   (a) an adjustable resistor,
   (b) means connecting said resistor in series with the load,
   (c) a source of known voltage,
   (d) means connecting together the resistor and the source to connect the voltage of the source in balanced opposition to the voltage developed across the resistor by the load current therethrough,
   (e) a galvanometer including a light source and a mirror, said galvanometer being connected to the resistor and the source to detect any lack of balance between said voltages,
   (f) variable resistance means,
   (g) means connecting said variable resistance means in series with the load,
   (h) photo-sensitive means located to receive light from said light source deflected by said mirror for detecting the magnitude and sense of deflection of the galvanometer,
   (i) means connecting said photo-sensitive means to said variable resistance means to vary the same to modify the load current to restore said balance,
   (j) and means regulating the temperature of the adjustable resistor and the source.

7. In a circuit having means for supplying a predetermined direct voltage to a load, the provision of means for maintaining constant the value of said supplied voltage, said maintaining means comprising
   (a) means for generating a voltage proportional to the actual value of said supplied voltage,
   (b) a source of standard voltage,
   (c) a galvanometer including a light source and a mirror, said galvanometer being connected to said voltage generating means and to said source for comparing said proportional voltage to said standard voltage and for detecting any lack of equality between said proportional voltage and said standard voltage,
   (d) variable resistance means,
   (e) means connecting said variable resistance means in said supplying means in series with the load,
   (f) and photo-sensitive means located to receive light from said light source deflected by said mirror for detecting the magnitude and sense of deflection of the galvanometer,
   (g) said photo-sensitive means being connected to said variable resistance means to vary the same to modify said supplying means to restore equality between said proportional and standard voltages,
   (h) further photo-sensitive means for detecting occurrence of failure or excessive deflection of the galvanometer, (i) and safety means connected to said further photosensitive means for actuation thereby to interrupt the circuit through the galvanometer upon such an occurrence.

References Cited by the Examiner
UNITED STATES PATENTS

| | | | |
|---|---|---|---|
| 2,136,682 | 11/1938 | Gilbert | 323—4 X |
| 2,491,305 | 12/1949 | Faus | 323—4 |
| 2,673,952 | 3/1954 | Hoover | 321—13 |
| 2,815,487 | 12/1957 | Kaufman | 321—8 X |
| 2,833,938 | 5/1958 | Pinckaers | 307—88.5 |
| 3,068,408 | 12/1962 | Lovegrove | 307—88.5 |
| 3,210,647 | 10/1965 | Dyke | 323—21 |
| 3,229,158 | 1/1966 | Jensen | 323—21 X |

JOHN F. COUCH, Primary Examiner.

W. E. RAY, K. D. MOORE, Assistant Examiners.